Dec. 10, 1957 P. J. BROWNSCOMBE 2,815,696
BRIGHTNESS CONTROL MEANS
Filed Oct. 27, 1953
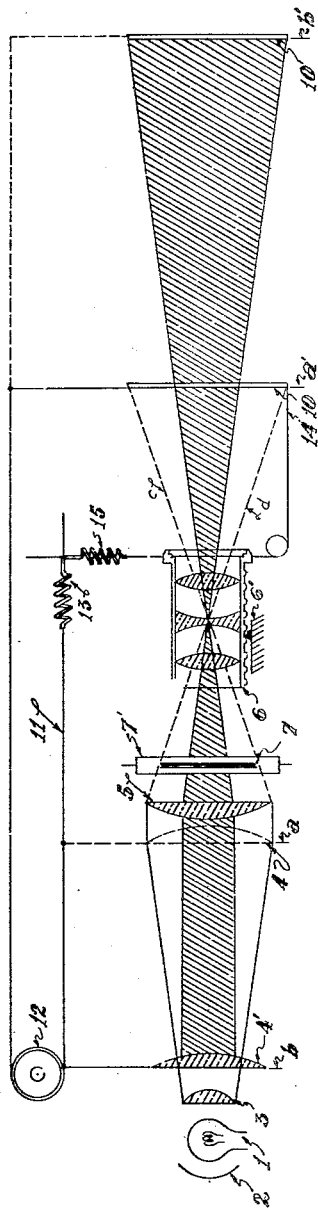
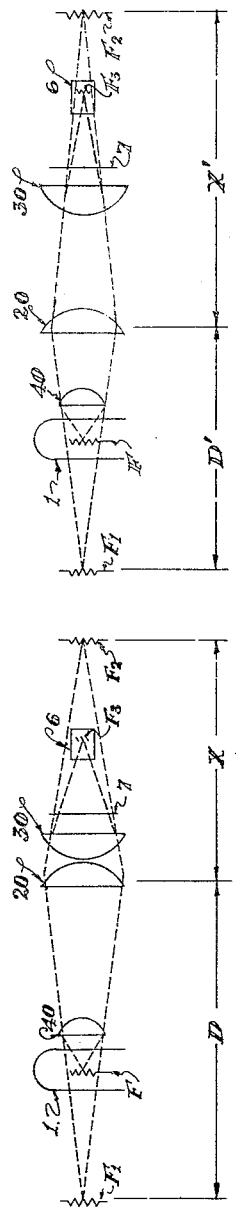
INVENTOR.
Phillip J. Brownscombe.

United States Patent Office 2,815,696
Patented Dec. 10, 1957

2,815,696

BRIGHTNESS CONTROL MEANS

Philip J. Brownscombe, Chatham, N. J., assignor to Viewlex, Inc., Long Island City, N. Y., a corporation of New York Application October 27, 1953, Serial No. 388,618

2 Claims. (Cl. 88—24)

This invention relates to means for stabilizing the brightness of a projected image on a movable screen. More particularly, the invention relates to a condensing lens system for providing an adjustable illumination angle.

In projection systems, radiation from a light source is collected by a system of condensing lenses which reconcentrate this light in an image of the light source within or near an objective lens, the purpose of which objective lens is to form an image of the film on a screen. The condensing lens systems vary widely with respect to the number of lenses used, the type of lenses, and their placement.

If in a projection system of this type it is desired to show on the same size screen a greater magnification of the object (film), it may be done by moving the screen farther from the film and moving the objective lens a small distance to refocus the image at the new screen position. When this is done a smaller portion of the film area is visible on the screen and the illumination intensity at the screen is reduced inversely as the square of the magnification. For example, if the full size film image of 2½" square is shown on a 30" square screen at the magnification of 12 × and the screen distance is increased to obtain a magnification of 30 ×, the portion of film image which may be seen on the screen at this greater magnification is 1" square. At the same time the illumination intensity will be reduced in the ratio $(2.5)^2 = 6.25$.

In certain instances, for instance, microfilm readers, a viewing screen or reflector may be moved a considerable distance. As a result, the brightness on the screen may vary considerably. For instance, if the enlargement, i. e. magnification varies 3:1 the brightness will vary inversely proportionally to the square or 1:9. This variation is not tolerable and therefore, provision must be made for stabilizing the brightness.

Prior art devices generally use a mechanical diaphragm to cut off some of the light when the screen or reflector is close, and the diaphragm is opened up as the screen is moved away. With these prior systems, some of the available light is thrown away and wasted, whereas, in the movable lens system of the present invention all of the available light is used at all times. Diaphragm type devices may be tolerable in prior systems of low magnification ratio, but are not adequate in microfilm reader systems having large enlargement ratios.

In projection devices which utilize this principle of obtaining variable magnification, such as a microfilm viewer, the resultant variation in illumination intensity is disturbing to the user. One method of overcoming this difficulty which has been used in such apparatus is to place a variable aperture within the objective lens, couple this aperture to the screen movement and so reduce the illumination intensity at the lesser magnification, to, or near, the level which obtains at the greatest magnification.

A much more efficient, and therefore, more desirable method of obtaining uniform illumination intensity would be to change the condensing system as the screen is moved away from the film in such a way as to concentrate the available light onto the smaller portion of film image being viewed on the screen. This invention describes a means for accomplishing this end.

The present invention generally comprises a light source, a collector lens in front of the light source and a movable condenser lens which moves along the optical axis of the system. The movable lens is big enough to receive the entire light beam from the collector lens at all positions. The movable lens system is designed to focus the light through a film onto an objective lens by making its travel limits define a conjugate relationship, as will be discussed.

The light beam then emerges on the other side of the objective lens with a beam width dependent upon the position of the movable sliding lens. A movable screen or reflector is adapted to move along the optical axis of the system on the other side of the objective lens. The movable screen is connected to the movable lens with a simple linkage such as a cable system. A movable screen is also connected to the objective lens so that the image will be focused properly for all positions of the movable screen.

The parameters of the system are chosen so that the light beam just covers the full screen at all positions of the screen. That is, the light beam is varied so that when the screen is at its maximum distance, the light beam is narrowest and vice versa. Therefore, all the available light is evenly spread over the screen or reflector at any of its positions. If a movable reflector is used, it would probably be tilted with respect to the optical axis of the system so that the image will be reflected onto another reflector or screen outside the optical axis of the system. An example of this type system is illustrated in copending application S. N. 392,595, filed November 18, 1953, for a Microfilm Reader System.

The present invention is not limited to microfilm readers, however, but may be used wherever a movable screen, reflector or light source is used and it is desired to stabilize the brightness for instance in spectrography.

Accordingly, a principal object of the present invention is to provide new and improved means for brightness control of projected images.

Another object of the present invention is to provide new and improved brightness control means in a system using a movable screen or reflector.

Another object of the present invention is to provide new and improved brightness control means in a system using a movable screen or reflector, using a movable lens system.

Another object of the present invention is to provide new and improved means for varying the light beam width inversely proportionally to the distance to a movable screen or reflector.

Another object of the present invention is to provide a new and improved means for maintaining constant light intensity on a movable screen without the use of mechanical diaphragm apertures.

Another object of the present invention is to provide new and improved means for maintaining constant light intensity on a movable screen comprising a movable lens system designed to pass substantially all the light through a fixed objective lens system.

Another object of the present invention is to provide a new and improved movable condensing lens system adapted to focus substantially on a plane by choosing its travel limits to be conjugate distances.

Another object of the present invention is to provide means to control brightness by varying beam width with a movable lens and means to focus said lens at a point at both extremes of its travel.

These and other objects of the invention will be apparent from the following specification and drawings:

Figure 1 is a schematic view of an embodiment of the invention, illustrating the movable beam width.

Figures 2 and 3 are diagrams illustrative of the focusing operation of the invention.

Referring to Figure 1, there is shown a light source 1 and reflector 2, a collector lens 3 is placed in front of the light source so as to confine the light beam to a predetermined angle. In front of the collector lens 3 is shown a condenser lens 4 which is adapted to move along an optical axis of the system from the position "a" to "b."

On the other side of the movable lens is placed a fixed lens 5 which is adapted to focus the light on an objective lens 6. The light from the lens 5 passes through the film 7 containing the image or information to be projected.

On the other side of the objective lens is shown a movable screen or reflector 10 which is adapted to move along the optical axis of the system for instance, from position $a'$ to $b'$. If element 10 is used as a reflector rather than a viewing screen it would preferably be tilted relative the beam axis to reflect to another screen, not shown. The purpose of moving the screen 10 is for varying the enlargement of the image since, as is well known, the enlargement is proportional to the distance of the screen from the objective lens, the object distance being substantially constant. Suitable guides, not shown, are preferably provided for moving the screen.

In particular applications for instance, in a microfilm reader as discussed in the above mentioned copending application, the enlargement varies from approximately 10 to 30 or a ratio of 1 to 3. Therefore, the brightness on the screen will vary approximately 9:1 over this range if means were not required to stabilize the brightness. Prior devices generally used a mechanical diaphragm of the iris type to vary the amount of light which is transmitted. In these systems, the amount of light which is cut down by narrowing the aperture of the diaphragm for close positions of the screen, so that light that does not pass through the aperture is thrown away and wasted.

In systems having enlargement ratios of 2½ or 3 to 1, it is not feasible to throw away any light since otherwise, the size of the light source will be prohibitive.

In the present invention, the moving lens is connected to the movable screen by a simple mechanical linkage which may be a cable 11 which is connected from the movable screen 10 around a pulley 12 to the movable lens 4. The free end of the cable 11 is spring loaded by the spring 13 connected to a solid object for instance, the casing of the apparatus. The movable screen 10 is also connected with a cable 14 to the objective lens 6 and is also spring loaded at its free end to a solid object by spring 15. Cable 14 is wound about the barrel of the objective lens 6 so that as the screen 10 moves the barrel of the objective lens turns. The barrel of the lens 6 has a helical thread in which rides a fixed pin in a solid mounting 6'. Therefore, as the strip 14 is moved, the objective lens will be turned so as to keep the image focused on the movable screen.

The operation of the system is as follows:

With the lens 4 positioned at "b" and the screen in position $b'$, the light beam is as shown in the shaded area.

When the lens 4 is in position "a" and the screen 10 is in position "$a'$," the beam width is greater as shown by the outer lines, $cd$, which extend beyond the shaded area.

Therefore, it is seen that when the screen is at its maximum distance, all the available light is concentrated on a narrow beam shown by the shaded area, and as the screen is moved into the position "$a'$" the beam is correspondingly widened by the movement of the lens 4. Note that the lens 4 passes all the light available in any position. The lens 4 should be large enough to intercept the entire beam when it is in position "a." The operation of the system is automatically compensating since the lens 4 and the screen 10 are mechanically connected together. The mechanical support for the lens 4 and the screen 10 are not shown but they may be any of a number of alternative arrangements. For instance, the lens 4 assembly may be mounted in a vertical position inside a cylindrical cover so that it will slide smoothly. The film 7 is preferably mounted in a film holder 7' so that it may be moved in two directions perpendicular to the optical axis of the system, for the purpose of centering the image and choosing certain parts of the image to view.

The lens spacing of Figure 1 is exaggerated to illustrate the variable beam angle. The proper spacing for focusing on the objective lens will be discussed in connection with Figures 2 and 3.

Figure 2 shows the three lens condensing system of the present invention. Lens 40 produces a virtual image of lamp filament F at $F_1$. Therefore the light source for lens 20 is this image $F_1$. Lens 20 produces an image at $F_2$ (if lens 30 and objective are removed). Lens 30, having image $F_2$ as its light source, produces a final filament image $F_3$ in or near the objective lens 6. The design is such that the illuminated diameter at the film plane 7, is just sufficient to cover the required size at minimum magnification.

In order to accomplish our goal of reduced illumination diameter at the film we design the system with a liberal spacing between lenses 40 and 20. Then we move lens 20 from its position in Figure 2 closer to lens 40 as the magnification is increased. The convergent cone of light leaving lens 20 then strikes lens 30 in a smaller diameter and so the illuminated diameter at the film is also smaller as in Figure 3.

There is another very important requirement for successful operation. The cone of light which illuminates the smaller film 7 area must pass in its entirety thru the objective lens 6, for any light which does not so pass is lost and results in illumination loss or vignetting at the screen. This means, in effect, that the final image $F_3$ must remain within or close to the objective lens 6. In other words image $F_3$ must not shift far as lens 20 is moved.

Since the position of image $F_3$ is determined by the location of $F_2$ this requirement means that image $F_2$ must remain substantially in one place. This requirement is met by designing the system in such a way that when lens 20 is moved from one extreme position to the other, the conjugate distances are reversed. In other words the distance D from $F_1$ to lens 20 Figure 2, is made equal to the distance X' from lens 20 to $F_2$ Figure 3. Therefore, the distances X and D' will necessarily be equal. The position of $F_2$ and hence $F_3$ remains unchanged by the shift of lens 20. When lens 2 is in intermediate positions between its extremes there will be a small shift of image $F_2$ toward the film, but this is very slight and of no practical significance.

I claim:

1. Brightness control means for a movable screen comprising a fixed position light source, a first fixed collector lens in front of said source, a condensing lens movable along the axis of the light path in front of said fixed lens, a second fixed lens in front of said movable lens along said axis, a focussing lens located at the focal point of said second fixed lens, a screen movable along said axis in front of said focussing lens, and means to move said movable lens and movable screen comprising a mechanical linkage connecting said movable lens and said movable screen, said linkage including means to maintain spacing between said movable lens and said movable screen.

2. Apparatus as in claim 1 wherein said mechanical linkage comprises cable means connecting said movable lens and said movable screen.

References Cited in the file of this patent

UNITED STATES PATENTS

| | | |
|---|---|---|
| 1,211,302 | Dutert | Jan. 2, 1917 |
| 2,389,087 | Schubert | Nov. 13, 1945 |

FOREIGN PATENTS

| | | |
|---|---|---|
| 257,153 | Switzerland | Mar. 16, 1949 |